United States Patent [19]

Moritani et al.

[11] Patent Number: 4,613,644

[45] Date of Patent: Sep. 23, 1986

[54] RESINOUS COMPOSITION

[75] Inventors: Tohei Moritani; Kyoichiro Ikari, both of Kurashiki, Japan

[73] Assignee: Kuraray Co., Ltd., Kurashiki, Japan

[21] Appl. No.: 708,794

[22] Filed: Mar. 6, 1985

[30] Foreign Application Priority Data

Mar. 23, 1984 [JP] Japan .................................. 59-57087
May 10, 1984 [JP] Japan .................................. 59-93934

[51] Int. Cl.$^4$ ........................... C08K 3/18; C08K 3/22
[52] U.S. Cl. .................................. 524/430; 524/239; 524/417; 524/434; 524/436
[58] Field of Search ............... 524/430, 239, 436, 417, 524/434

[56] References Cited

U.S. PATENT DOCUMENTS

| | | | |
|---|---|---|---|
| 2,413,856 | 1/1947 | Bersworth | 524/239 |
| 2,874,140 | 2/1959 | Kloepfer | 524/430 |
| 3,051,663 | 8/1962 | Coler et al. | 524/239 |
| 3,474,058 | 10/1969 | Ridgeway et al. | 524/230 |
| 3,655,828 | 4/1972 | Rushton | 524/239 |
| 3,857,754 | 12/1974 | Hirata et al. | 428/36 |
| 3,975,463 | 8/1976 | Hirata et al. | 428/35 |
| 4,079,850 | 3/1978 | Suzuki et al. | 428/516 |
| 4,284,671 | 8/1981 | Cancio et al. | 428/35 |
| 4,446,254 | 5/1984 | Nakae et al. | 524/436 |

FOREIGN PATENT DOCUMENTS

| | | | |
|---|---|---|---|
| 51-36244 | 3/1976 | Japan | 524/436 |
| 53-251 | 1/1978 | Japan | 524/436 |
| 54-100442 | 8/1979 | Japan | 524/436 |
| 55-80445 | 6/1980 | Japan | 524/436 |
| 55-135153 | 10/1980 | Japan | 524/436 |
| 1545096 | 5/1979 | United Kingdom . | |
| 2038844 | 7/1980 | United Kingdom | 524/436 |

*Primary Examiner*—Joseph L. Schofer
*Assistant Examiner*—N. Sarofim
*Attorney, Agent, or Firm*—Kramer and Brufsky

[57] ABSTRACT

A resinous composition composed of a thermoplastic resin, a saponified product of ethylene-vinyl acetate copolymer, and a low-molecular salt or oxide containing at least one element selected from Groups I to III of the Periodic Table. The composition provides molded items which are free of fish eyes and superior in gas barrier properties.

16 Claims, No Drawings

RESINOUS COMPOSITION

BACKGROUND OF THE INVENTION

1. Field of the Invention

The present invention relates to a resinous composition composed of a thermoplastic resin and a saponified product of ethylene-vinyl acetate copolymer, said composition being greatly improved in miscibility.

2. Description of the Prior Art

A blend composition composed of a thermoplastic resin and a saponified product of ethylene-vinyl acetate copolymer (abbreviated as EVOH hereinafter) has unique characteristic properties, as disclosed in Japanese Patent Laid-open No. 20073/1981 (U.S. Pat. No. 4,284,671). It can be used in place of thermoplastic resin or EVOH in multilayer coextrusion of thermoplastic resin and EVOH, or it can be used as an interlayer between a thermoplastic resin layer and an EVOH layer to increase the interlaminar strength. The blend composition can also be made into film or sheet or bottle by melt extrusion molding, followed by stretching and/or heat treatment. These products are superior in gas barrier properties and mechanical strength. However, the blend composition is generally so poor in miscibility that it tends to undergo phase separation during extrusion molding of film, sheet, or bottle. After continued operation for a long time, the phase separation forms a foreign substance that impairs the external appearance of products. This problem also exists in the case of blend composition composed of thermoplastic resin (e.g., polyethylene terephthalate, polyamide, and polyethylene), EVOH, and ionomer, such as those disclosed in Japanese Patent Laid-open No. 141785/1977 (British Pat. No. 1545096) and Japanese Patent Laid-open No. 10149/1973 (U.S. Pat. No. 3857754 and U.S. Pat. No. 3975463).

In spite of its outstanding features, the blend composition composed of thermoplastic resin and EVOH cannot be practically used for extrusion molding or can be used only in a limited period of operation.

SUMMARY OF THE INVENTION

In order to overcome the disadvantage of being poor in miscibility and to utilize the outstanding features in practical applications, the present inventors carried out extensive studies on the way of producing good-looking moldings from a blend composition of thermoplastic resin and EVOH. As the result, it was found that the blend composition of a thermoplastic resin with EVOH is greatly improved in miscibility when it is incorporated with a low-molecular weight salt or oxide containing at least one element selected from Groups I to III of the Periodic Table. Such a blend composition provides good-looking coextrusion moldings having a high interlaminar strength, and are superior in gas barrier properties and mechanical properties. The present invention was completed based on this finding.

Accordingly, it is an object of the present invention to provide a resinous composition having improved miscibility which comprises (A) a thermoplastic resin, (B) a saponified product of ethylene-vinyl acetate copolymer and (C) a low-molecular weight salt or oxide containing at least one element selected from Groups I to III of the Periodic Table.

DETAILED DESCRIPTION OF THE PREFERRED EMBODIMENTS

The thermoplastic resin (A) used in this invention includes polyolefin resins, polyamide resins, polyester resins, polystyrene resins, polyvinyl chloride resins, acrylic resins, polyvinylidene chloride resins, polyurethane resins, polyvinyl acetate resins, and polycarbonate resins. Most important among them are polyolefin resins, polyamide resins, and polyester resins, and next important are polyvinyl chloride resins and polystyrene resins. Any other thermoplastic resins may be used which form fish eyes when mixed with EVOH for molding.

Examples of the polyolefin resins include high-, medium-, and low-density polyethylenes; polyethylene copolymers with vinyl acetate, acrylate ester, or α-olefin such as butene, hexene, and 4-methyl-1-pentene; ionomer resins; polypropylene homopolymer; ethylene-grafted polypropylene; polypropylene copolymers with α-olefin such as butene, hexene, and 4-methyl-1-pentene; modified polypropylene blended with elastomeric polymer; and modified polyolefins formed by reacting poly-1-butene, poly-4-methyl-1-pentene, or the above-mentioned polyolefin with maleic anhydride. Important among them are polypropylene resins because they are particularly poor in miscibility with EVOH and the effect of this invention is remarkable for them.

Examples of the polyamide resins include polycapramide (nylon-6), poly-ω-aminoheptane acid (nylon-7), poly-ω-aminononane acid (nylon-9), polyundecaneamide (nylon-11), polylauric lactam (nylon-12), polyethylenediamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6), polydecamethylene adipamide (nylon-10,6), polydodecamethylene sebacamide (nylon-10,8), caprolactam-lauric lactam copolymer, caprolactam-hexamethylene diammonium adipate copolymers, lauric lactam-hexamethylene diammonium adipate copolymer, hexamethylene diammonium adipate-hexamethylene diammonium sebacate copolymer, ethylene diammonium adipate-hexamethylene diammonium adipate copolymer, and caprolactam-hexamethylene diammonium adipate-hexamethylene diammonium sebacate copolymer. Practically important among them are caprolactam-hexamethylene diammonium adipate copolymer (nylon-6/66). It provides a blend with EVOH having superior physical properties.

Examples of the polyester resins include poly(ethylene terephthalate), poly(butylene terephthalate), poly(ethylene terephthalate-isophthalate), and poly(ethylene glycol-cyclohexanedimethanol-terephthalate). They may contain as a comonomer component a diol (e.g., ethylene glycol, butylene glycol, cyclohexanedimethanol, neopentyl glycol, and pentane diol) or a dicarboxylic acid (e.g., isophthalic acid, benzophenone dicarboxylic acid, diphenylsulfone dicarboxylic acid, diphenylmethane dicarboxylic acid, propylene bis (phenylcarboxylic acid), diphenyloxide dicarboxylic acid, oxalic acid, malonic acid, succinic acid, glutaric acid, adipic acid, pimelic acid, suberic acid, azelaic acid, sebacic acid, and diethyl succinic acid).

Examples of the polyvinyl chloride resins include homopolymer of vinyl chloride and copolymers of vinyl chloride with vinyl acetate, maleic acid derivative, or higher alkylvinyl ether.

Examples of the polystyrene resins include styrene homopolymer, butadiene-grafted polystyrene copolymer, polystyrene-butadiene rubber blend, and styrene-maleic anhydride copolymer.

The EVOH (B) used in this invention denotes an ethylene-vinyl acetate copolymer in which some of the vinyl acetate units are hydrolyzed. One which contains a comparatively small amount of ethylene units and has a high degree of saponification (hydrolysis) of vinyl acetate units is poor in miscibility with a thermoplastic resin and tends to cause fish eyes in the molding process. Particularly, one which contains 20 to 50 mol%, preferably 25 to 45 mol%, of ethylene units and has a degree of saponfication of vinyl acetate units in excess of 96%, especially in excess of 99%, is highest in gas barrier properties among thermoplastic resins. It provides superior containers when used in the form of composite with a polyolefin. Thus it is particularly important in this invention.

The third constituent (C) of the composition of this invention is a low-molecular weight salt or oxide containing at least one element selected from Groups I to III of the Periodic Table. It includes oxides (e.g., calcium oxide, magnesium oxide, barium oxide, and zinc oxide); metal salts of fatty acid; metal salts of ethylenediaminetetraacetic acid; and hydrotalcites. Salts containing a Group II metal (e.g., magnesium, calcium, and zinc) are particularly effective. The fatty acid constituting the metal salts of fatty acid includes lower fatty acids (e.g., acetic acid, butyric acids, caproic acid, and caprylic acid) and higher fatty acids (e.g., lauric acid, stearic acid, and myristic acid). Preferable among the examples are calcium salts, magnesium salts, and zinc salts of a higher fatty acid having 8 to 22 carbon atoms. Examples of metal salts of ethylenediaminetetraacetic acid include disodium salt, trisodium salt, tetrasodium salt, dipotassium salt, tripotassium salt, tetrapotassium salt, disodium-monomagnesium salt, disodium-monopotassium salt, disodium-monomagnesium salt, disodium-monoiron salt, disodium-monozinc salt, disodium-monobarium salt, disodium-monomanganese salt, disodium-monolead salt, and dipotassium-monomagnesium salt. The hydrotalcites are double salts represented by the formula:

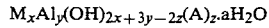

(where M denotes Mg, Ca, or Zn; A denotes $CO_3$ or $HPO_4$; and x, y, z, and a are all integers). Preferred examples include the following.

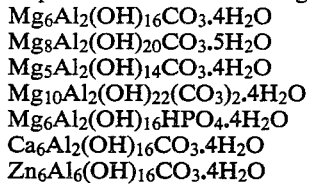

The constituents (A), (B), and (C) of the composition of this invention are not specifically limited in their quantities, and their quantities are properly selected according to the intended application. However, from a practical point of view, it is desirable that either thermoplastic resin (A) or EVOH (B) accounts for a greater portion than the other in the composition. Such a composition exhibits unique performance in physical properties and gas barrier properties. In the case of compositions containing more thermoplastic resin (A) than EVOH (B), the weight ratio of (A) to (B) is 60:40 to 99.9:0.1, preferably 70:30 to 99.7:0.3. In the case where the thermoplastic resin is a polyolefin, the weight ratio of polyolefin (A) to EVOH (B) is 80:20 to 99.9:0.1, preferably 90:10 to 99.7:0.3. In the case of compositions containing less thermoplastic resin (A) than EVOH (B), the weight ratio of (A) to (B) is 1:99 to 40:60, preferably 5:95 to 30:70.

The salt or oxide (C) containing an element of Groups I to III which improve the miscibility is added in such an amount that the improvement of miscibility is realized and the resulting composition is not adversely affected in physical properties, gas barrier properties, and clarity. Usually, the quantity is 0.00001 to 10 parts by weight, preferably 0.0001 to 1 part by weight, based on 100 parts by weight of thermoplastic resin (A) and EVOH (B) in total. If it is added in amount in excess of 10 parts by weight, the resulting composition is improved in miscibility but is poor in other properties. A good effect is produced if the component (C) is previously incorporated into the thermoplastic resin and/or EVOH. For example, EVOH (100 parts by weight) is incorporated with 0.002 to 0.5 parts by weight of the component (C), and 0.5 parts by weight of this EVOH is mixed with 99.5 parts by weight of thermoplastic resin. A composition thus prepared is greatly improved in miscibility at the time of melt molding. In such a composition, the quantity of component (C) is 0.00001 to 0.0025 parts by weight for 100 parts by weight of thermoplastic resin and EVOH in total. Component (C) in an amount less than 0.00001 parts by weight produces no significant effects.

The composition of this invention can be produced by any blending method. The three components may be dryblended all at once, or the component (C) is previously incorporated into a part or all of the thermoplastic resin or EVOH. These methods may be used in combination for a better effect.

The composition of this invention is greatly improved in miscibility by the low-molecular weight salt or oxide (C) containing an element selected from Groups I to III in the Periodic Table, as mentioned above. The mechanism of it is not fully elucidated; but it is considered that the effect is produced as the result of rheological behavior of the melt of thermoplastic resin and EVOH and complex chemical reactions with impurities in the composition. Interestingly, it was found that EVOH is deteriorated when a Ti compound which is a catalyst residue contained in polypropylene resins is added to it, but the deterioration is prevented when EVOH is incorporated with the component (C). This suggests that in a mixture of polypropylene resin and EVOH, a Ti compound reacts with EVOH to bring about poor miscibility and the component (C) interferes with the action of a Ti compound. This mechanism, however, may not be generalized in view of the fact that poor miscibility occurs in a mixture of a Ti-free polyolefin and EVOH, and the poor miscibility is improved by the component (C) of this invention.

The composition of the present invention may be incorporated with other additives which are commonly used for thermoplastic resins. Examples of such additives include antioxidant, UV absorber, plasticizer, antistatic agent, slip agent, colorant, filler, and other polymeric compounds. They may be added in such an amount that does not detract from the effect of this invention. Examples of the additives are listed in the following.

Antioxidant: 2,5-di-t-butylhydroquinone, 2,6-di-t-butyl-p-cresol, 4,4'-thiobis-(6-t-butylphenol), 2,2'-methylene-bis(4-methyl-6-t-butylphenol), octadecyl-3-(3',5'-di-t-butyl-4'-hydroxyphenyl)propionate, and 4,4'-thiobis-(6-t-butylphenol).

UV absorber: Ethyl-2-cyano-3,3-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, and 2-hydroxy-4-octyloxybenzophenone.

Plasticizer: Dimethyl phthalate, diethyl phthalate, dioctyl phthalate, wax, liquid paraffin, and phosphate ester.

Antistatic agent: Pentaerythritol monostearate, sorbitan monopalmitate, sulfated oleic acid, polyethylene oxide, and carbowax.

Slip agent: Ethylene bisstearamide and butyl stearate.

Colorant: Carbon black, phthalocyanine, quinacridone, indoline, azo pigment, titanium oxide, and red oxide.

Filler: Glass fiber, asbestos, mica, wollastonite, calcium silicate, and calcium carbonate.

In addition to the additives listed above, many other polymeric compounds can be added in such an amount that does not detract from the effect of this invention.

The above-mentioned components for the composition of this invention can be blended by using a ribbon blender, kneader, mixing roll, extruder, or intensive mixer.

The resinous composition of this invention can be formed into film, sheet, tube, or bottle by using a known melt extrusion molding machine, compression molding machine, transfer molding machine, injection molding machine, blow molding machine, thermoforming machine, rotational molding machine, or dip molding machine. The extrusion temperature at the time of molding should be properly selected according to the type and molecular weight of the resin and the blending ratio of the composition; but it is usually 170° to 350° C.

In the case where the composition of this invention is used as one layer of a laminate, it exhibits its unique feature in adhesion as mentioned earlier. The maximum interlaminar bond strength is achieved when the laminate has the construction of F/E/F, F/F'/F, F/D/E, F/D/E/D/F, P/E/P/F, P/F/D/E/D/F/P, or P/F/D/E/D/P. (where P stands for a thermoplastic resin layer, E, an EVOH layer, D, an adhesive resin layer, F, a layer of the composition of this invention, and F', F containing a large amount of EVOH.) Laminates of such a construction have a good appearance due to superior miscibility. In the production of laminates as mentioned above, the composition of this invention may be replaced by scrap of laminate.

The multilayer forming may be accomplished by the so-called coextrusion technology which employs as many extruders as the number of layers. The flows of the resin melts produced by the extruders are placed one over another to form a laminate. The multilayer forming may also be accomplished by extrusion coating or dry lamination. Molded items made only of the composition of this invention or multilayer products containing the composition of this invention may be subjected to monoaxial stretching, biaxial stretching, or blow stretching, whereby they are further improved in physical properties and gas barrier properties. The molded items produced from the composition of this invention are superior in external appearance, physical properties, and gas barrier properties because the composition is uniform on account of good miscibility.

The invention is now described with reference to the following examples, in which "parts" means "parts by weight".

EXAMPLE 1

A resinous composition of this invention was prepared by dry blending 99 parts of polypropylene resin {melt flow index (ASTM-D1238): 0.5 g/10 min at 230° C.}, 1 part of EVOH {content of ethylene unit: 33 mol%, degree of saponification: 99.9 mol%, and melt index (at 190° C. under 2160 g): 1.5 g/10 min}, and 0.2 parts of disodium-monomagnesium ethylenediaminetetraacetate. The composition was fed into a full-flighted screw extruder having a diameter of 40 mm, an L/D ratio of 24, and a compression ratio of 3.8, and extruded into 50 μm thick film through a 550 mm wide flat die. The extrusion temperatures at the extruder and die were kept at 190°–230° C. and 220° C., respectively. The extrusion operation was continued for 6 hours. The resulting film was uniform in appearance, and any phase separation due to poor miscibility was not observed.

COMPARATIVE EXAMPLE 1

Example 1 was repeated except that disodium-monomagnesium ethylenediaminetetraacetate was not added. About 30 minutes after the start of operation, foreign matters resulting from phase separation began to appear; and they increased in number with time. Thus, the resulting film was very poor in appearance.

EXAMPLES 2 to 14

Different kinds of resinous compositions were prepared by dryblending the same polypropylene resin and EVOH as used in Example 1 and the component (C) as shown in Table 1. The resulting compositions were extruded into film in the same manner as in Example 1. The evaluation of the resulting film is shown in Table 1.

EXAMPLES 15 to 17

100 parts of EVOH and a prescribed amount of disodium-monomagnesium ethylenediaminetetraacetate (as shown in Table 1) were blended and pelletized by using an extruder at 225° C. 0.5 parts of the pellets was dryblended with 99.5 parts of polypropylene, and the resulting blend was extruded into film in the same manner as in Example 1. The evaluation of the resulting film is shown in Table 1.

TABLE 1

| Example | PP (Parts) | EVOH (Parts) | Component (C) Compound | (Parts) | Film surface | Hue of film |
|---|---|---|---|---|---|---|
| 2 | 95 | 5 | Trisodium ethylenediaminetetraacetate | 0.05 | Fair | Excel |
| 3 | 80 | 20 | Dipotassium ethylenediaminetetraacetate | 0.1 | Fair | Excel |
| 4 | 98 | 3 | Disodium-monocalcium ethylenediaminetetraacetate | 0.2 | Very excel | Excel |
| 5 | 90 | 10 | Disodium-monomagnesium ethylenediaminetetraacetate | 0.07 | Very excel | Excel |
| 6 | 99 | 1 | Magnesium stearate | 0.03 | Excel | Fair |
| 7 | 98 | 2 | Calcium stearate | 0.05 | Excel | Fair |

TABLE 1-continued

| Example | PP (Parts) | EVOH (Parts) | Component (C) Compound | (Parts) | Film surface | Hue of film |
|---|---|---|---|---|---|---|
| 8 | 99.7 | 0.3 | Calcium laurate | 0.02 | Excel | Fair |
| 9 | 96 | 4 | Calcium myristate | 0.04 | Excel | Fair |
| 10 | 89 | 11 | Hydrotalcite {Mg$_6$Al$_2$(OH)$_{16}$CO$_3$.4H$_2$O} | 0.05 | Good | Excel |
| 11 | 96 | 4 | Hydrotalcite {Mg$_{10}$Al$_2$(OH)$_{22}$(CO$_3$)$_2$.4H$_2$O} | 0.1 | Good | Excel |
| 12 | 99 | 1 | Hydrotalcite {Ca$_6$Al$_2$(OH)$_{16}$CO$_3$.4H$_2$O} | 0.2 | Good | Excel |
| 13 | 70 | 30 | Calcium oxide | 1 | Fair | Fair |
| 14 | 90 | 10 | Magnesium oxide | 0.5 | Fair | Fair |
| 15 | 99.5 | 0.5 | Disodium-monomagnesium ethylenediaminetetraacetate | 0.00001 | Fair | Excel |
| 16 | 99.5 | 0.5 | Disodium-monomagnesium ethylenediaminetetraacetate | 0.0001 | Good | Excel |
| 17 | 99.5 | 0.5 | Disodium-monomagnesium ethylenediaminetetraacetate | 0.001 | Good | Excel |

Note to Table 1
(1) The state of the film surface was evaluated according to the following criterion.
Very excellent: Miscibility is good and uniform, and phase separation and foreign matters are not found.
Excellent: Miscibility is good and uniform, but phase separation and foreign matters apppear slightly after operation for a long time.
Good: Miscibility is good, but phase separation and foreign matters appear partly.
Fair: Slight phase separation and foreign matters appear despite improved miscibility.
(2) The hue of the film was evaluated according to the following criterion.
Excellent: No yellowing at all.
Good: Partial and slight yellowing.
Fair: Slight yellowing.

EXAMPLE 18

A resinous composition of this invention was prepared by dry blending 95 parts of polyethylene resin {melt index (ASTM-D1238): 1.9 g/10 min at 190° C.}, 5 parts of EVOH {content of ethylene unit: 44 mol%, degree of saponification: 99.9 mol%, and melt index (at 190° C. under 2160 g): 4.8 g/10 min}, and 0.1 parts of trisodium ethylenediaminetetraacetate. The composition was fed into a full-flighted screw extruder having a diameter of 40 mm, an L/D ratio of 24, and a compression ratio of 3.8, and extruded into 50 μm thick film through a 550 mm wide flat die. The extrusion temperatures at the extruder and die were kept at 130°-185° C. and 190° C., respectively. The extrusion operation was continued for 12 hours. The resulting film was uniform in appearance, and any phase separation due to poor miscibility was not observed.

COMPARATIVE EXAMPLE 2

Example 18 was repeated except that trisodium ethylenediaminetetraacetate was not added. About 3 hours after the start of operation, foreign matters resulting from phase separation began to appear; and they increased in number with time. Thus, the resulting film was very poor in appearance.

EXAMPLE 19

A resinous composition of this invention was prepared by blending the following five components (A,B,C,D,E) at the ratio of 97.4:0.5:0.1:1:1.
(A) Polypropylene resin having a melt flow index of 0.5 g/10 min.
(B) EVOH (content of ethylene unit: 32.5 mol%, degree of saponification: 99.9 mol%, and melt index: 1.4 g/10 min).
(C) Calcium stearate
(D) Modified polypropylene adhesive resin (ADMER QF-500, a product of Mitsui Petrochemical Co., Ltd.).
(E) Titanium oxide.

The composition (F) and the above-mentioned EVOH (B) and adhesive resin (D) were fed into separate extruders and coextruded into a 1 mm thick multilayer sheet having the construction of F/D/B/D/F, with the ratio of layer thicknesses being 15:1:1:1:15.

Extrusion of (B) and (D) was carried out by using a single-screw extruder having a diameter of 50 mm and an L/D ratio of 25, at 180° to 215° C. Extrusion of (F) was carried out by using a twin-screw extruder (turning in the same direction) having a diameter of 100 mm and an L/D ratio of 22, at 180° to 220° C. A 1000-mm wide feed-block type die heated at 225° C. was used.

Even after continuous operation for 24 hours, sheet of good quality was produced, without phase separation and foreign matters resulting from poor miscibility.

COMPARATIVE EXAMPLE 3

Example 19 was repeated except that calcium stearate was not added. About 1 hour after the start of operation, foreign matters resulting from phase separation began to appear; and they increased in number with time. Thus, the resulting sheet was very poor in appearance.

EXAMPLE 20

A resinous composition of the invention was prepared by dry blending the following three components by using a Henschel mixer for 3 minutes at room temperature.
(1) Isotactic polypropylene (density (ASTM-D1505): 0.906 g/cc, melt index (ASTM-D1238): 0.8 g/10 min)
(2) EVOH pellets (ethylene content: 33 mol%, degree of saponification: 99.9%, melt index: 1.2 g/10 min) which had previously been blended with 0.05 wt% of hydrotalcite {Ca$_6$Al$_2$(OH)$_{16}$CO$_3$.4H$_2$O}.

The blending ratio of the three components was 98/2/0.1 by weight.

The composition was fed to an extruder having a screw 40 mm in diameter and 800 mm in effective length. (This extruder is for an intermediate layer.) The EVOH (in the form of pellets blended with 0.5 wt% of hydrotalcite) was fed to another extruder having a screw 65 mm in diameter and 1430 mm in effective length, equipped with an adaptor having two branched melt channels. (This extruder is for the internal and external layers.) Thus three-layer coextrusion was performed by using a triple die at 240° C. and oval bottles having the laminate structure were produced by the known blow molding method. Even after continuous operation for 48 hours, it was possible to produce bottles of uniform good quality. Phase separation and foreign matters resulting from poor miscibility were not found.

The resulting bottle was found to have an average wall thickness of 600 μm, with the ratio of external layer:intermediate layer:internal layer being 4.5:1:4.5, and a volume of about 280 cc.

COMPARATIVE EXAMPLE 4

Example 20 was repeated except that hydrotalcite was not added. About 3 hours after the start of operation, foreign matters resulting from phase separation began to appear; and they increased in number with time. Thus, the resulting bottles were very poor in appearance.

EXAMPLE 21

A resinous composition of this invention was prepared by dry blending 30 parts of 6/66 polyamide copolymer (content of 66 component: 15%, melting point: 198° C.), 70 parts of EVOH {content of ethylene unit: 33 mol%, degree of saponification: 99.9 mol%, and melt index (at 190° C. under 2160 g): 1.5 g/10 min}, and 0.2 parts of disodium-monomagnesium ethylenediaminetetraacetate. The composition was fed into a full-flighted screw extruder having a diameter of 40 mm, an L/D ratio of 24, and a compression ratio of 3.8, and extruded into 100 μm thick film through a 550 mm wide flat die. The extrusion temperatures at the extruder and die were kept at 190°–230° C. and 225° C., respectively. The extrusion operation was continued for 6 hours. The resulting film was uniform in appearance, and any phase separation due to poor miscibility was not observed.

A test piece measuring 90 by 90 mm was cut out of the film. After heating at 85° C. for 1 minute, it was stretched three times longer than the original in both longitudinal and lateral directions at a rate of 5 m/min by using a testing machine for biaxial stretching (made by Toyo Seiki Seisakusho K.K.). Uniform stretching was achieved. While being fixed to a wooden frame, the stretched film underwent heat treatment at 110° C. in a hot air drier. Thus there was obtained a piece of film which was superior in strength and gas barrier properties.

COMPARATIVE EXAMPLE 5

Example 21 was repeated except that disodium-monomagnesium ethylenediaminetetraacetate was not added. About 30 minutes after the start of operation, foreign matters resulting from phase separation began to appear; and they increased in number with time. Thus, the resulting film was very poor in appearance.

EXAMPLES 22 to 34

Different kinds of resinous compositions were prepared by dry-blending the same 6/66 polyamide copolymer (PA) and EVOH as used in Example 21 and the component (C) as shown in Table 2. The resulting compositions were extruded into film in the same manner as in Example 21. The evaluation of the resulting film is shown in Table 2.

EXAMPLES 35 to 37

100 parts of EVOH in the form of slurry in methanol was incorporated with a prescribed amount of disodium-monomagnesium ethylenediaminetetraacetate (as shown in Table 2), followed by drying. 70 parts of the EVOH was dryblended with 30 parts of the same polyamide copolymer as used in Example 21, and the resulting blend was extruded into film in the same manner as in Example 21. The evaluation of the resulting film is shown in Table 2.

TABLE 2

| Example | PA (Parts) | EVOH (Parts) | Component (C) Compound | (Parts) | Film surface |
|---|---|---|---|---|---|
| 22 | 95.5 | 0.5 | Disodium EDTA | 0.05 | Excel |
| 23 | 30 | 70 | Dipotassium EDTA | 0.1 | Excel |
| 24 | 20 | 80 | Disodium-monocalcium EDTA | 0.2 | Very excel |
| 25 | 70 | 30 | Disodium-monomagnesium EDTA | 0.07 | Very excel |
| 26 | 10 | 90 | Magnesium stearate | 0.03 | Good |
| 27 | 99 | 1 | Calcium stearate | 0.05 | Good |
| 28 | 80 | 20 | Calcium laurate | 0.02 | Good |
| 29 | 30 | 70 | Calcium myristate | 0.04 | Good |
| 30 | 30 | 70 | Hydrotalcite {$Mg_6Al_2(OH)_{16}CO_3.4H_2O$} | 0.05 | Good |
| 31 | 30 | 70 | Hydrotalcite {$Mg_{10}Al_2(OH)_{22}(CO_3)_2.4H_2O$} | 0.1 | Good |
| 32 | 80 | 20 | Hydrotalcite {$Ca_6Al_2(OH)_{16}CO_3.4H_2O$} | 0.2 | Good |
| 33 | 20 | 80 | Calcium oxide | 1 | Fair |
| 34 | 10 | 90 | Magnesium oxide | 0.5 | Fair |
| 35 | 90 | 10 | Disodium-monomagnesium EDTA | 0.0002 | Fair |
| 36 | 90 | 10 | Disodium-monomagnesium EDTA | 0.002 | Good |
| 37 | 90 | 10 | Disodium-monomagnesium EDTA | 0.02 | Excel |

Note to Table 2
(1) The state of the film surface was evaluated according to the following criterion.
Very excellent: Miscibility is good and uniform, and phase separation and foreign matters are not found.
Excellent: Miscibility is good and uniform, but phase separation and foreign matters appear slightly after operation for a long time.
Good: Miscibility is good, but phase separation and foreign matters appear partly.
Fair: Slight phase separation and foreign matters appear despite improved miscibility.
(2) EDTA stands for ethylenediaminetetraacetic acid.

EXAMPLE 38

A resinous composition of this invention was prepared by dry blending 80 parts of polyethylene terephthalate (PET), 20 parts of the same EVOH as used in Example 1, and 0.2 parts of disodium-monomagnesium ethylenediaminetetraacetate. The composition was fed into a full-flighted screw extruder having a diameter of 40 mm, an L/D ratio of 24, and a compression ratio of 3.8, and extruded into 100 μm thick film through a 550 mm wide flat die. The extrusion temperatures at the extruder and die were kept at 200°–275° C. and 265° C., respectively. The extrusion operation was continued for 6 hours. The resulting film was uniform in appearance, and any phase separation due to poor miscibility was not observed.

A test piece measuring 90 by 90 mm was cut out of the film. After heating at 85° C. for 1 minute, it was stretched three times longer than the original in both longitudinal and lateral directions at a rate of 5 m/min by using a testing machine for biaxial stretching (made by Toyo Seiki Seisakusho K.K.). Uniform stretching was achieved. While being fixed to a wooden frame, the stretched film underwent heat treatment at 160° C. in a hot air drier. Thus there was obtained a piece of film which was superior in strength and gas barrier properties.

COMPARATIVE EXAMPLE 6

Example 38 was repeated except that disodium-monomagnesium ethylenediaminetetraacetate was not added. Immediately after the start of operation, a large number of foreign matters resulting from phase separation began to appear; and they increased in number with time. Thus, the resulting film was very poor in appearance.

EXAMPLES 39 to 51

Different kinds of resinous compositions were prepared by dry-blending the same PET and EVOH as used in Example 38 and the component (C) as shown in Table 3. The resulting compositions were extruded into film in the same manner as in Example 38. The evaluation of the resulting film is shown in Table 3.

EXAMPLES 52 to 54

100 parts of EVOH in the form of slurry in methanol was incorporated with a prescribed amount of disodium-monomagnesium ethylenediaminetetraacetate (as shown in Table 3), followed by drying. 20 parts of the EVOH was dry-blended with 80 parts of the same PET as used in Example 38, and the resulting blend was extruded into film in the same manner as in Example 38. The evaluation of the resulting film is shown in Table 3.

(C) calcium stearate
(D) Modified ethylene-vinyl acetate copolymer adhesive resin.

The composition (F) and the above-mentioned EVOH (B) and adhesive resin (D) were fed into separate extruders and coextruded into a 1 mm thick multilayer sheet having the construction of F/D/B/D/F, with the ratio of layer thicknesses being 15:1:1:1:15.

Extrusion of (B) and (D) was carried out by using a single-screw extruder having a diameter of 50 mm and an L/D ratio of 25, at 180° to 215° C. Extrusion of (F) was carried out by using a twin-screw extruder (turning in the same direction) having a diameter of 100 mm and an L/D ratio of 22, at 150° to 220° C. A 1000-mm wide feed-block type die heated at 225° C. was used.

Even after continuous operation for 24 hours, sheet of good quality was produced, without phase separation and foreign matters resulting from poor miscibility.

COMPARATIVE EXAMPLE 8

Example 55 was repeated except that calcium stearate (C) was not added. About 1 hour after the start of operation, foreign matters resulting from phase separation began to appear; and they increased in number with time.

EXAMPLES 56 to 68

Different kinds of resinous compositions were prepared by dry-blending the same polystyrene resin (PS), EVOH, and adhesive resin (A) as used in Example 55 and the component (C) as shown in Table 4. The resulting compositions were extruded into sheet in the same manner as in Example 55. The evaluation of the resulting sheet is shown in Table 4.

EXAMPLES 69 to 71

TABLE 3

| Example | PET (Parts) | EVOH (Parts) | Component (C) Compound | (Parts) | Film surface |
|---|---|---|---|---|---|
| 39 | 80 | 20 | Disodium EDTA | 0.05 | Excel |
| 40 | 30 | 70 | Dipotassium EDTA | 0.1 | Excel |
| 41 | 80 | 20 | Disodium-monocalcium EDTA | 0.2 | Very excel |
| 42 | 30 | 70 | Disodium-monomagnesium EDTA | 0.07 | Very excel |
| 43 | 10 | 90 | Magnesium stearate | 0.03 | Good |
| 44 | 99 | 1 | Calcium stearate | 0.05 | Good |
| 45 | 80 | 20 | Calcium laurate | 0.02 | Good |
| 46 | 30 | 70 | Calcium myistate | 0.04 | Good |
| 47 | 30 | 70 | Hydrotalcite $\{Mg_6Al_2(OH)_{16}CO_3.4H_2O\}$ | 0.05 | Good |
| 48 | 30 | 70 | Hydrotalcite $\{Mg_{10}Al_2(OH)_{22}(CO_3)_2.4H_2O\}$ | 0.1 | Good |
| 49 | 80 | 20 | Hydrotalcite $\{Ca_6Al_2(OH)_{16}CO_3.4H_2O\}$ | 0.2 | Good |
| 50 | 20 | 80 | Calcium oxide | 1 | Fair |
| 51 | 80 | 20 | Magnesium oxide | 0.5 | Fair |
| 52 | 80 | 20 | Disodium-monomagnesium EDTA | 0.0004 | Fair |
| 53 | 80 | 20 | Disodium-monomagnesium EDTA | 0.004 | Good |
| 54 | 80 | 20 | Disodium-monomagnesium EDTA | 0.04 | Excel |

*The state of the film surface was evaluated in the same way as in Table 2.
**EDTA stands for ethylenediaminetetraacetate.

EXAMPLE 55

A resinous composition of this invention was prepared by blending the following four components (A,B,C,D) at the ratio of 96:3:1:0.2.
  (A) Impact resistant polystyrene resin (melt flow index: 2.2 g/10 min).
  (B) EVOH (content of ethylene unit: 32.5 mol%, degree of saponification: 99.9 mol%, and melt index: 1.4 g/10 min).

100 parts of EVOH in the form of slurry in methanol was incorporated with a prescribed amount of disodium-monomagnesium ethylenediaminetetraacetate (as shown in Table 4), followed by drying. The resulting EVOH was dry-blended with the same polystyrene resin and adhesive resin as used in Example 55, and the resulting blend was coextruded into sheet in the same manner as in Example 55. The evaluation of the resulting sheet is shown in Table 4.

TABLE 4

| Example | PS (Parts) | EVOH (Parts) | AD (Parts) | Component (C) Compound | (Parts) | Film surface |
|---|---|---|---|---|---|---|
| 56 | 80 | 20 | 2 | Disodium EDTA | 0.05 | Excel |
| 57 | 70 | 30 | 2 | Dipotassium EDTA | 0.1 | Excel |
| 58 | 80 | 20 | 1 | Disodium-monocalcium EDTA | 0.2 | Very excel |
| 59 | 70 | 30 | 0 | Disodium-monomagnesium EDTA | 0.07 | Very excel |
| 60 | 90 | 10 | 2 | Magnesium stearate | 0.03 | Good |
| 61 | 99 | 1 | 1 | Calcium stearate | 0.05 | Good |
| 62 | 80 | 20 | 2 | Calcium laurate | 0.02 | Good |
| 63 | 70 | 30 | 2 | Calcium myristate | 0.04 | Good |
| 64 | 80 | 20 | 1 | Hydrotalcite $\{Mg_6Al_2(OH)_{16}CO_3.4H_2O\}$ | 0.05 | Good |
| 65 | 90 | 10 | 1 | Hydrotalcite $\{Mg_{10}Al_2(OH)_{22}(CO_3)_2.4H_2O\}$ | 0.1 | Good |
| 66 | 95 | 5 | 2 | Hydrotalcite $\{Ca_6Al_2(OH)_{16}CO_3.4H_2O\}$ | 0.2 | Good |
| 67 | 95 | 5 | 1 | Calcium oxide | 1 | Good |
| 68 | 90 | 10 | 2 | Magnesium oxide | 0.5 | Good |
| 69 | 96 | 3 | 1 | Disodium-monomagnesium EDTA | 0.00006 | Good |
| 70 | 96 | 3 | 1 | Disodium-monomagnesium EDTA | 0.0006 | Excel |
| 71 | 96 | 3 | 1 | Disodium-monomagnesium EDTA | 0.006 | Excel |

*The state of the film surface was evaluated in the same way as in Table 1.
**EDTA stands for ethylenediaminetetraacetate.

EXAMPLE 72

A resinous composition of the invention was prepared by mixing the following three components.

(1) 80 parts of polyvinyl chloride (PVC) having an average degree of polymerization of 1300.
(2) 20 parts of EVOH (ethylene content: 44 mol%, degree of saponification: 99 mol%, and melt index: 5 g/10 min).
(3) 0.3 parts of hydrotalcite $\{Mg_6Al_2(OH)_{16}CO_3.4H_2O\}$.
(4) 38 parts of dioctyl phthalate.

The composition was formed into a 100 μm thick film by using a 28 inch inverted L-calender roll at 215° C. The resulting film was good in appearance and foreign matters resulting from poor miscibility were not found.

COMPARATIVE EXAMPLE 10

Example 72 was repeated except that hydrotalcite was not added. Foreign matters resulting from phase separation were found on the film surface, and the film was poor in appearance.

EXAMPLE 73 to 85

Resinous compositions of this invention were prepared by dry-blending the same polyvinyl chloride (PVC) and EVOH as in Example 72 and the component (c) as shown in Table 5. The compositions were made into film in the same manner as in Example 72. The evaluation of the resulting film is shown in Table 5.

EXAMPLES 86 to 88

100 parts of EVOH in the form of slurry in methanol was incorporated with a prescribed amount of disodium-monomagnesium ethylenediaminetetraacetate (as shown in Table 5), followed by drying. 20 parts of the EVOH was dryblended with 80 parts of the same polyvinyl chloride resin as used in Example 72. The resulting blend was extruded into film in the same manner as in Example 72. The evaluation of the resulting film is shown in Table 5.

TABLE 5

| Example | PVC (Parts) | EVOH (Parts) | Component (C) Compound | (Parts) | Film surface |
|---|---|---|---|---|---|
| 73 | 10 | 90 | Disodium EDTA | 0.05 | Excel |
| 74 | 30 | 70 | Dipotassium EDTA | 0.1 | Excel |
| 75 | 80 | 20 | Disodium-monocalcium EDTA | 0.2 | Very excel |
| 76 | 70 | 30 | Disdoium-monomagnesium EDTA | 0.07 | Very excel |
| 77 | 10 | 90 | Magnesium stearate | 0.03 | Good |
| 78 | 99 | 1 | Calcium stearate | 0.05 | Good |
| 79 | 80 | 20 | Calcium laurate | 0.02 | Good |
| 80 | 30 | 70 | Calcium myristate | 0.04 | Good |
| 81 | 30 | 70 | Hydrotalcite $\{Mg_6Al_2(OH)_{16}CO_3.4H_2O\}$ | 0.05 | Very excel |
| 82 | 30 | 70 | Hydrotalcite $\{Mg_{10}Al_2(OH)_{22}(CO_3)_2.4H_2O\}$ | 0.1 | Very excel |
| 83 | 80 | 20 | Hydrotalcite $\{Ca_6Al_2(OH)_{16}CO_3.4H_2O\}$ | 0.2 | Very excel |
| 84 | 20 | 80 | Calcium oxide | 1 | Good |
| 85 | 80 | 20 | Magnesium oxide | 0.5 | Good |
| 86 | 80 | 20 | Disodium-monomagnesium EDTA | 0.0004 | Good |
| 87 | 80 | 20 | Disodium-monomagnesium EDTA | 0.004 | Good |
| 88 | 80 | 20 | Disodium-monomagnesium EDTA | 0.04 | Excel |

*The state of the film surface was evaluated in the same way as in Table 1.
**EDTA stands for ethylenediaminetetraacetate.

What is claimed is:

1. A resinous composition which comprises (A) is thermoplastic resin, (B) a saponified product of ethylene-vinyl acetate copolymer, and (C) a salt or oxide selected from the group consisting of (i) the oxides of at least one element selected from Groups I, II and III of the periodic table (ii) the fatty acid salts of at least one element selected from Groups I, II and III of the periodic table (iii) the ethylenediaminetetraacetic acid salts of at least one element selected from Groups I, II and III of the periodic table and (iv) hydrotalcites, the quantity of component (C) being 0.00001 to 10 parts by weight based on 100 parts by weight of the total weight of the thermoplastic resin A and the saponified product of ethylene-vinyl acetate copolymer (B).

2. A resinous composition as set forth in claim 1, wherein the thermoplastic resin (A) is a polyolefin resin.

3. A resinous composition as set forth in claim 2, wherein the thermoplastic resin (A) is a polypropylene resin.

4. A resinous composition as set forth in claim 1, wherein the thermoplastic resin (A) is a polyamide resin.

5. A resinous composition as set forth in claim 1, wherein the thermoplastic resin (A) is a polyester resin.

6. A resinous composition as set forth in claim 1, wherein the thermoplastic resin (A) is a polystyrene resin.

7. A resinous composition as set forth in claim 1, wherein the thermoplastic resin (A) is a polyvinyl chloride resin.

8. A resinous composition as set forth in claim 1, wherein the saponified product of ethylene-vinyl acetate copolymer (B) is one in which the content of ethylene units is 20 to 50 mol% and the degree of saponification of vinyl acetate units is greater than 96 mol%.

9. A resinous composition as set forth in claim 1, wherein the component (C) is a salt containing an element of Group II of the Periodic Table.

10. A resinous composition as set forth in claim 1, wherein the component (C) is a salt of ethylenediaminetetraacetic acid.

11. A resinous composition as set forth in claim 1, wherein the component (C) is a hydrotalcite compound.

12. A resinous composition as set forth in claim 1, wherein the component (C) is a salt of a higher fatty acid having 8 to 22 carbon atoms.

13. A resinous composition according to claim 1 in which the elements in Groups I, II and III of the periodic table are selected from the group consisting of sodium, potassium, magnesium, calcium, barium, zinc and aluminum.

14. A resinous composition according to claim 13 in which component (C) is a salt or oxide selected from the group consisting of (i) the oxides of calcium, magnesium, zinc, or barium, (ii) the calcium, magnesium, zinc or barium salts of a fatty acid, (iii) the sodium, potassium, magnesium, zinc, barium and/or calcium salts of ethylenediaminetetraacetic acid, and (iv) hydrotalcites.

15. A resinous composition which comprises (A) a thermoplastic resin, (B) a saponified product of ethylene-vinyl acetate copolymer, and (C) a salt or oxide selected from the group consisting of (i) the oxides of calcium, magnesium, zinc or barium, (ii) the calcium, magnesium or zinc salts of fatty acids, (iii) the sodium, potassium, calcium, magnesium, manganese, iron, zinc, barium and/or lead salts of ethylenediaminetetraacetic acid, and (iv) hydrotalcites.

16. A resinous composition according to claim 15 in which component (C) is a salt or oxide selected from the group consisting of (i) the oxides of calcium or magnesium, (ii) the calcium or magnesium salts of lauric, myristic or stearic acids, (iii) the sodium, potassium, calcium and/or magnesium salts of ethylenediaminetetraacetic acid, and (iv) magnesium or calcium hydrotalcites.

* * * * *

UNITED STATES PATENT AND TRADEMARK OFFICE
CERTIFICATE OF CORRECTION

PATENT NO. : 4,613,644

DATED : September 23, 1986

INVENTOR(S) : Tohei Moritani et al

It is certified that error appears in the above-identified patent and that said Letters Patent is hereby corrected as shown below:

In Claim 1, line 1 thereof, delete "is"

and insert in lieu thereof --a--.

Signed and Sealed this

Twenty-third Day of December, 1986

Attest:

DONALD J. QUIGG

Attesting Officer       Commissioner of Patents and Trademarks